United States Patent
Bruckert

[19]

[11] Patent Number: 5,838,733
[45] Date of Patent: Nov. 17, 1998

[54] METHOD AND APPARATUS FOR MITIGATING SIGNAL DISTORTION IN A COMMUNICATION SYSTEM

[75] Inventor: Eugene J. Bruckert, Arlington Heights, Ill.

[73] Assignee: Motorola, Inc., Schaumburg, Ill.

[21] Appl. No.: 897,189

[22] Filed: Jul. 21, 1997

Related U.S. Application Data

[63] Continuation of Ser. No. 173,434, Dec. 23, 1993, abandoned.

[51] Int. Cl.$^6$ .............................. H04K 1/02; H04L 25/03
[52] U.S. Cl. ........................... 375/297; 375/345; 455/63; 455/126; 455/295
[58] Field of Search ..................................... 375/284, 285, 375/296, 297, 348, 345; 370/201; 348/608; 455/501, 63, 67.3, 114, 115, 116, 117, 126, 235.1, 250.1, 295, 308

[56] References Cited

U.S. PATENT DOCUMENTS

| | | | |
|---|---|---|---|
| 4,228,368 | 10/1980 | Orban | 455/114 |
| 4,481,547 | 11/1984 | Sato | 360/33.1 |
| 4,534,054 | 8/1985 | Maisel | 381/13 |
| 4,674,122 | 6/1987 | Orban | 381/13 |
| 4,701,953 | 10/1987 | White | 381/106 |
| 4,704,727 | 11/1987 | Beard | 381/13 |
| 5,066,923 | 11/1991 | Gailus et al. | 330/107 |
| 5,125,100 | 6/1992 | Katznelson | 455/63 |
| 5,170,495 | 12/1992 | McNicol et al. | 455/116 |
| 5,193,224 | 3/1993 | McNicol et al. | 455/63 |

*Primary Examiner*—Don N. Vo
*Attorney, Agent, or Firm*—Richard A. Sonnentag

[57] ABSTRACT

A communication system mitigates signal distortion of output signals transmitted by a transmitter element (406). The communication system obtains parameters related to, inter alia, the number of traffic channels utilized by the system, the number of RF channels utilized by the system, the voltage levels of certain signal waveforms (321) within the system and information related to power levels being transmitted by the transmitter element (406). The communication system utilizes the obtained parameters to, in a first embodiment, clip the signal waveform at certain portions that exceed a determined threshold, and, in a second embodiment, automatic gain control the signal waveform during a symbol time period. By clipping or automatically gain controlling the input signal into the transmitting element (406), the distortion of a signal output from the transmitting element (406) is mitigated.

2 Claims, 3 Drawing Sheets

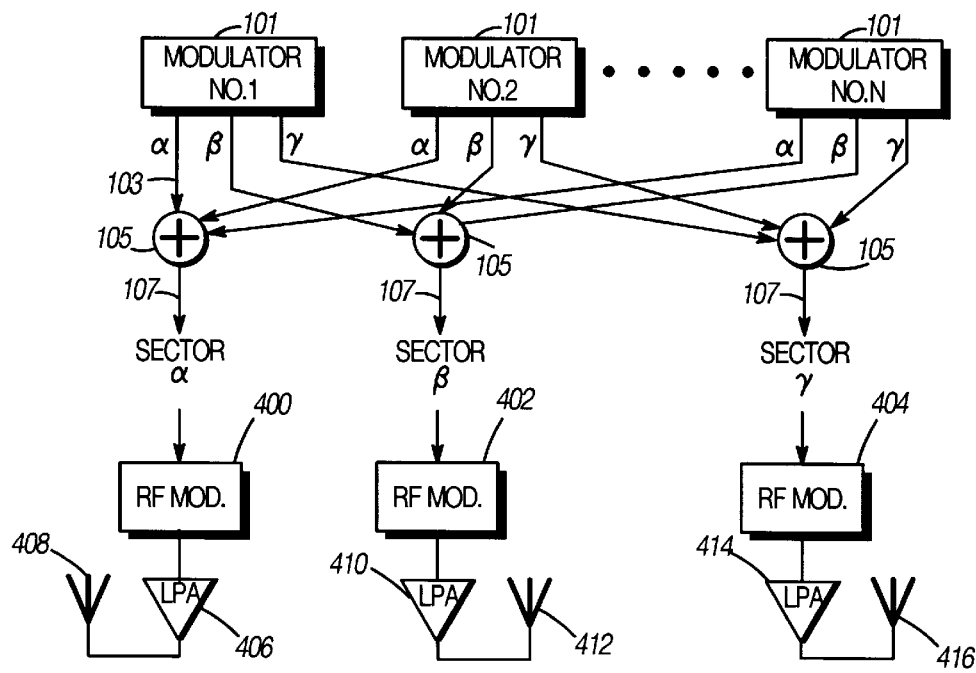
FIG.4
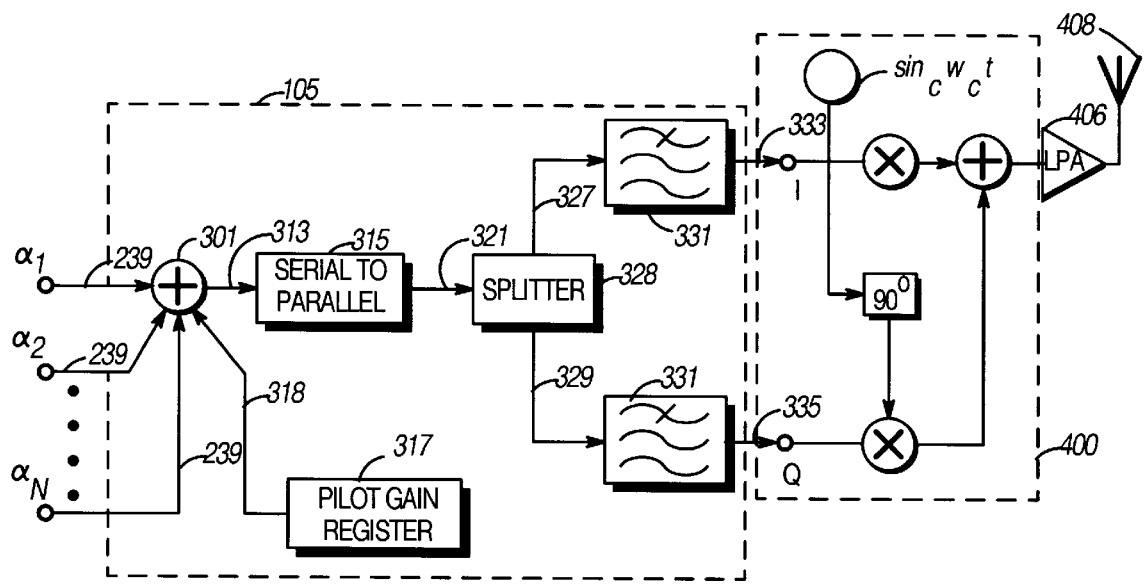
FIG.5 — PRIOR ART —

METHOD AND APPARATUS FOR MITIGATING SIGNAL DISTORTION IN A COMMUNICATION SYSTEM

This a continuation of application Ser. No. 08/173,434 filed Dec. 23, 1993 and now abandoned.

FIELD OF THE INVENTION

The present invention relates to communication systems and, more particularly, to a method and apparatus for mitigating signal distortion in such communication systems.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the information signal into a form suitable for transmission over the channel. This processing of the information signal is referred to as modulation. The function of the channel is to provide a physical connection between the transmitter output and the receiver input. The function of the receiver is to process the received signal so as to produce an estimate of the original information signal. This processing of the received signal is referred to as demodulation.

Analog and digital transmission methods are used to transmit an information signal over a communication channel. The use of digital methods offers several operational advantages over analog methods, including but not limited to: increased immunity to channel noise and interference, flexible operation of the system, common format for the transmission of different kinds of information signals, improved security of communication through the use of encryption, and increased capacity.

These advantages are attained at the cost of increased system complexity. However, through the use of very large-scale integration (VLSI) technology, a cost-effective way of building the hardware has been developed.

To transmit an information signal (either analog or digital) over a bandpass communication channel, the information signal must be manipulated into a form suitable for efficient transmission over the channel. Modification of the information signal is achieved by means of a process termed modulation. This process involves varying some parameter of a carrier wave in accordance with the information signal in such a way that the spectrum of the modulated wave matches the assigned channel bandwidth. Correspondingly, the receiver is required to re-create the original information signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several information sources over a common channel. Also, modulation may be used to convert the information signal into a form less susceptible to noise and interference.

For multiplexed communication systems, the system typically consists of many remote units (i.e., subscriber units). Each subscriber unit requires a communication channel for short or discrete intervals of time rather than continuous service on a communication channel at all times. Therefore, communication systems have been designed to incorporate the characteristic of communicating with many remote units for brief intervals of time on the same communication channel. These systems are termed time division multiple access (TDMA) communication systems.

A Direct Sequence (DS) Code Division Multiple Access (CDMA) system is an access method where all subscriber units transmit information signals on the same frequency band simultaneously. Similarly, base stations transmit information signals intended for a particular subscriber unit by transmitting the information signals on the same frequency band as base station originated transmissions to other subscriber units. By necessity, the transmitted bandwidth from a base station is much larger than the information rate of the information signal, i.e. carrier bandwidth is large compared to the message bandwidth.

Most access methods use a digitized representation of voice as the information signal which must be transmitted. This type of information signal is typically produced by a speech coder. It will be appreciated by those skilled in the art that the information signal may also be derived from a data signal such as from a computer modem or data network. A base station typically accepts many information signals as input. In addition, each input signal originates from either a land based telephone or a mobile subscriber unit. Each information signal is multiplexed such that a single modified information signal is transmitted to a base station antenna at a comparatively high data rate.

As with any communication system, TDMA and CDMA systems suffer from distortion due to non-linearities in transmitting elements. The use of high power Linear Power Amplifiers (LPAs) having only a limited "linear" region contribute significantly to the problem of distortion. When the levels of signals input to LPAs are too high, the amplifier is unable to linearly reproduce the input signal, which results in distortion of the corresponding output signal. Thus, a need exists for a method and apparatus to mitigate signal distortion in such communication systems.

BRIEF DESCRIPTION OF THE DRAWINGS

FIG. 4 is a detailed block diagram of a system including the preferred embodiment BDC of FIG. 1.

FIG. 5 is a block diagram of a prior art system as shown in FIG. 4.

DETAILED DESCRIPTION OF A PREFERRED EMBODIMENT

A communication system mitigates signal distortion of output signals transmitted by a transmitter element 406. The communication system obtains parameters related to, inter alia, the number of traffic channels utilized by the system, the number of RF channels utilized by the system, the voltage levels of certain signal waveforms 321 within the system and information related to power levels being transmitted by the transmitter element 406. The communication system utilizes the obtained parameters to, in a first embodiment, clip the signal waveform at certain portions that exceed a determined threshold, and, in a second embodiment, automatic gain control the signal waveform during a symbol time period. By clipping or automatically gain controlling the signal input into the transmitting element 406, the distortion of a signal output from the transmitting element 406 is mitigated since the transmitting element 406 is not utilized in its non-linear range.

Figure 1:
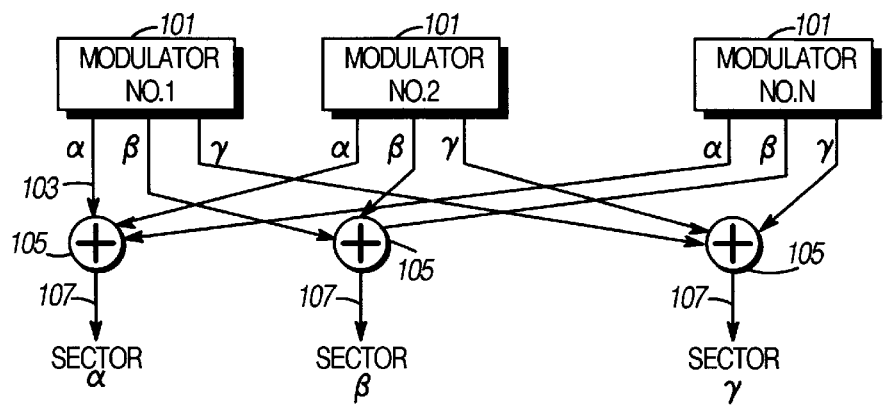
FIG. 1 is a block diagram showing a preferred embodiment connection of a Modem Channel Card (MCC) which supplies information to a Baseband Distribution and Combiner (BDC) which then supplies modified information signals to an antenna in accordance with the present invention.

Referring now to FIG. 1, the system architecture of a three-sector base station may be seen. Three Modem Channel Cards (MCC) 101 are shown. However, it will be appreciated by those skilled in the art that more MCCs (e.g. twenty MCCs) are typically used in a base station. Each MCC 101 typically takes eight digitally encoded voice signals as input, where a typical rate of arrival for each voice signal is at a rate of 9.6 kilobits per second (kbit/s). The MCC 101 performs various operations on the signals and communicates the multiplexed signals 103 to Baseband Distribution and Combiner (BDC) cards at a rate of 1.288 megachips per second (Mchips/s). Each BDC 105 accepts several other signals (e.g. 17 signals in addition to the 3 signals shown in FIG. 1) at a rate matching the rate of the first MCC multiplexed signal.

The BDC 105 sums the input signals and upsample filters the signal, thereby producing a quadraphase pair of channels 107 suitable for quadrature phase shift keying (QPSK) modulating an analog carrier signal. Further operations occur subsequent to BDC signal processing, such as amplifying the signal. The subsequent signal is Low Pass Filtered and amplified by means well known in the art. The amplified signal is radiated by the one antenna (e.g. sector a) that is operatively coupled to the BDC.

Figure 2:
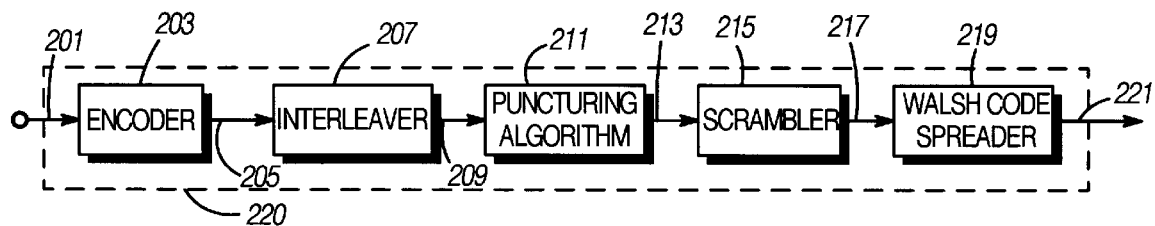
FIG. 2 is a detailed block diagram showing a portion of the preferred embodiment MCC shown in FIG. 1.

Referring now to FIG. 2 which shows the digital modulator portion 220 of the MCC 101, digitally encoded voice signals 201 are input to an encoder at a rate of 9.6 kbit/s. The encoder increases the data rate by a predetermined factor. In the preferred embodiment, the predetermined factor is two, thereby making the output rate 19.2 ksymbol/s. The output from the encoder is in the form of data symbols. The data symbols 205 are then input into an interleaver 207. Interleaver 207 block interleaves the input data symbols 205. In the interleaver 207, the data symbols are input column by column into a matrix and output from the matrix row by row. The interleaved data symbols 213 are output by the interleaver 207 at the same data symbol rate that they were input (e.g., 19.2 ksymbol/s).

The interleaved data symbols 213 are output to a puncturing algorithm 211. The puncturing algorithm receives a periodic power adjustment command once every 1.25 milliseconds. The power adjustment command is one or more bits of information. The puncturing algorithm overwrites one or more interleaved data symbols with each power adjustment command. The overwrite by the power adjustment command is treated as an erasure and is corrected by the error correction as decoded in the mobile unit receiver. The resultant interleaved data symbols 213 are output to a scrambler 215.

The scrambler enhances the security of the communication in the voice channel. The scrambler enhances security by use of a long PN code, exclusive-ORed with the interleaved data symbols. The scrambler outputs the result as scrambled data symbols.

Walsh code spreader 219 provides a unique user code that further spreads the scrambled data symbols. Walsh codes are generated by techniques that are well known in the art. The preferred embodiment uses Walsh codes generated by a Walsh function of order 64. The effect of the Walsh code spreading is to increase the symbol rate by a factor of 64. The Walsh code spreader 219 outputs chips 221 at a rate of 1.228 Mchip/s.

Figure 3:
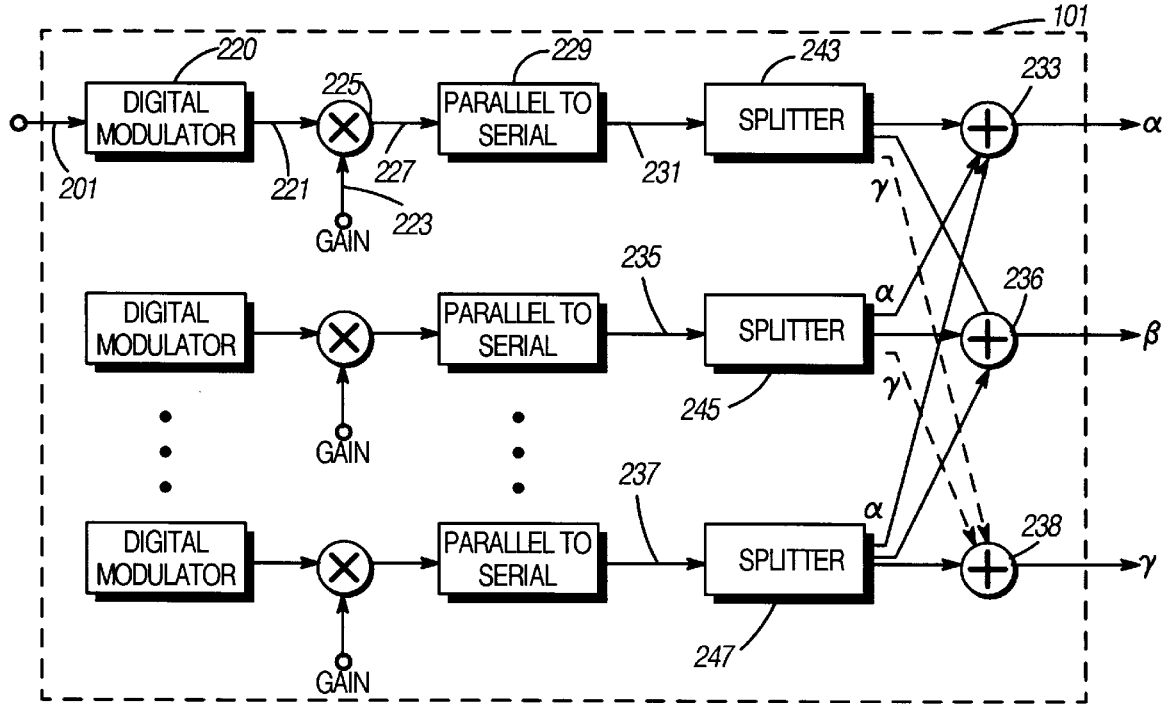
FIG. 3 is a detailed block diagram of another portion of the preferred embodiment MCC shown in FIG. 1.

Referring now to FIG. 3 which shows a detailed view of the other portions of the MCC 101 besides the digital modulator portion 220 which was shown in FIG. 2, gain adjustment 223 is made to the Walsh code spread signal 221. Gain adjustment 223 is a function of both the data rate of signal 201 and the forward power control level. Typically, gain is reduced 3 dB for every halving of the data rate. Also, a typical range for forward power control is 15 dB. The Walsh code spread signal 221 is multiplied by the appropriate gain for the channel by multiplier 225. The gain is based on the forward power control level for the channel and the current transmit bit rate. The resultant signal is a multiplied signal 227 consisting of a nine bit signed two's complement integer.

The nine bit signed two's complement integer is input to a parallel to serial converter 229 which produces a single channel serial bit stream 231. The single channel serial bit stream 231 of the particular voice channel is then input to a splitter 243 (as are outputs 235, 237 input into splitters 245, 247 respectively). Splitter 243 selects to which of summers 233, 236, 238 to send the signal. The preferred embodiment MCC 101 adds eight single channel serial bit streams in this manner. Components α, β, and γ outputs from the three channels are input into serial adders 233, 236, 238 to produce a composite of components α, β, and γ. These composites are communicated across a communication medium (i.e., a base station serial wireline backplane) to the second stage of signal modification as a multiplexed signal. Each multiplexed signal is distributed to a primary BDC 105 which completes the voice channel combining and modulation of the signals in preparation for radio frequency transmission to each of three cell site sectors α, β, and γ. It will be appreciated by those skilled in the art that fewer or more antenna sectors may be implemented without departing from the scope or spirit of the present invention.

Referring now to FIG. 4, there is shown the system architecture of a three-sector base station of FIG. 1 coupled to RF modulators 400, 402, 404 and likewise coupled to transmitting elements 406, 410, 414. In the preferred embodiment, transmitting elements 406, 410, 414 are linear power amplifiers (LPAs). As one of ordinary skill in the art will appreciate, however, the method/apparatus in accordance with the invention may be beneficially employed by any transmitting element within the chain of elements. LPAs 406, 410, 414 are respectively coupled to antennas 408, 412, 416 to facilitate RF communication to a subscriber unit (not shown).

Referring now to FIG. 5, there is shown a prior art a antenna sector BDC 105 which is one of three BDC's used for each base station cell site. Each of the three BDC circuits preferably are implemented on a single printed circuit board to reduce component complexity in the base site. Each BDC circuit corresponds to either sector α, β or γ respectively. A serial adder 301 accepts several multiplexed signals 239 (e.g., 20 antenna sector signals) as input. In addition, a pilot channel is added to form the combined signal 313. The pilot channel contains no data modulation and is characterized as an unmodulated spread spectrum signal that all the users of a particular cell-site or sector use for acquisition or tracking purposes. In generating the pilot signal, the unmodulated Walsh "zero" ($W_0$) sequence which consists of all zeros is used. Thus, the pilot signal is a DC bias. The output of the pilot gain register 317 is input to the serial adder 301. The serial adder 301 outputs a pilot augmented signal 313, which is input into serial-to-parallel block 315. Output of block 315 is a signal waveform 321.

Digital Quadrature Phase Shift Key (QPSK) spreading is the next process to be performed. It will be appreciated by one skilled in the art that more or less than four phase shifted signals may be used to modulate the waveform signal 321 (e.g. biphase shift keying (BPSK) could be used). More precisely, any number of phase shifted signals may be utilized in an M-ary phase shift keyed modulating scheme, wherein 'M' denotes the number of phases utilized by the modulating scheme.

Waveform signal 321 is next input into splitter 328. In the preferred embodiment, splitter 328 splits signal 321 evenly per bit to yield QPSK modulation. In an alternate embodiment, splitter 328 may be implemented to split every-other bit to the In-Phase (I) channel, and the remaining every-other bits to the Quadrature (Q) channels to yield true QPSK modulation. Continuing, two outputs are produced, i.e. the I-channel and Q-channel. In an embodiment utilizing independent quadrature channels, chip power is a function of the I-channel and Q-channel levels. Each of the I-channel 327 and Q-channel 329 are filtered by identical bandwidth limiting Finite Impulse Response (FIR) filters 331. The FIR filters 331 four times upsample the input signal and low pass filter the result to produce two signals: a filtered I-channel 333 and a filtered Q-channel 335. The FIR filters 331 restrict the output spectrum to the allowable bandwidth and provide sufficient attenuation to out-of-band energy. The filtered I-channel 333 and a filtered Q-channel 335 are then input into RF modulator 400, which is well known in the art. The filtered I-channel 333 and filtered Q-channel 335 are modulated to the RF carrier by being mixed with $\sin w_c t$ and $\cos w_c t$ respectively, amplified by LPA 406 and transmitted by sector antennae for sector $\alpha$. This configuration is identical for the other sectors $\beta$ and $\gamma$.

Figures 6, 7:
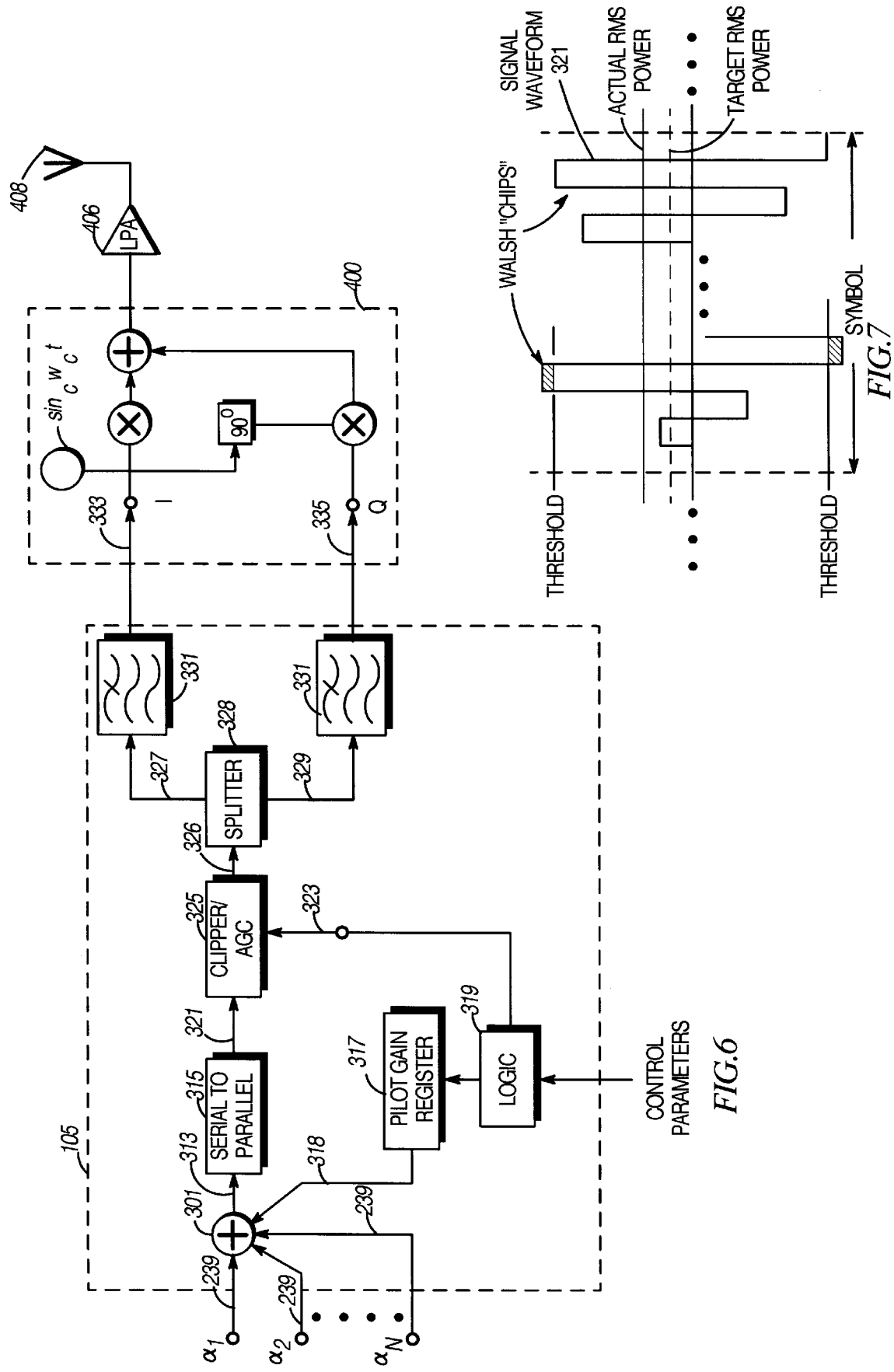
FIG. 6 generally depicts a block diagram of the system shown in FIG. 5 modified in accordance with the invention.
FIG. 7 generally depicts clipping of Walsh chips in accordance with the invention.

FIG. 6 generally depicts a modified BDC 105 in accordance with the invention. As shown in FIG. 6, logic circuitry 319 and dipper/AGC block 325 are added to the block diagram of FIG. 5. Logic circuitry 319 obtains control parameters from various other areas of the system, and the control parameters include, inter alia, the number of traffic channels utilized by the system, the number of RF channels utilized by the system, the voltage levels of certain signal waveforms (321) within the system and information related to power levels of being transmitted by the transmitter element (406). As will be appreciated by those skilled in the art, many parameters, in addition to the above-mentioned parameters, may be beneficially employed in accordance with the invention.

In the preferred embodiment, BDC 105 of FIG. 6 is utilized to perform clipping functions. During operation, logic circuitry 319 obtains some/all of the above-mentioned parameters while a signal waveform 321, as substantially shown in FIG. 7, enters clipper/AGC block 325. Based on the obtained parameters, for example a predetermined maximum threshold, clipper/AGC block 325 will clip those portions of signal waveform 321 which have levels above the predetermined threshold. Since, at this point the system is digital, clipper/AGC block 325 will "clip" a Walsh chip having a digital "number" greater than the predetermined threshold. The system will also clip/not clip based on a history of prior clipping of the signal waveform. For example, if no clipping had occurred in a certain number of prior symbols, the system is flexible enough to decide to "not clip" even if the level is slightly above the threshold.

While the system has been described above for a single carrier, the method/apparatus may be beneficially employed in multiple carrier scenarios as well. For example, in a multiple carrier scenario, a plurality of circuits depicted in FIG. 6 would be input into a single LPA. Logic circuitry 319 for each of the circuits shown in FIG. 6 would obtain parameters related to the corresponding signal waveforms, and would clip the levels of a determined one of the signal waveforms based on the parameters obtained. In the preferred embodiment, the system will clip the signal waveform having the largest level at a given time throughout the symbol time period. Should two clips be required during a symbol period, an alternate strategy would be to take into account received errors when making subsequent clip decisions.

In an alternate embodiment, BDC 105 of FIG. 6 is utilized to perform automatic gain control (AGC) functions. In this embodiment, operation is essentially the same, but now the entire signal waveform 321 as shown in FIG. 7 is gain controlled throughout a predetermined time period. In the preferred embodiment, the predetermined time period is a multiple of the symbol time period as shown in FIG. 7. To determine the automatic gain control value to send to clipper/AGC block 325, the logic circuitry 319 utilizes, inter alia, the mean of the power of the signal waveform over predetermined time period, a number of traffic channels utilized by the communication system, or a combination of both. Another parameter which may likewise be beneficially employed is a parameter received from a transmitting element related to the linearity (or nonlinearity) of the transmitting element. For example, if a transmitting element informs logic circuitry 319 that excess out-of-band energy is being generated during transmission, logic circuitry 319 will instruct clipper/AGC block 325 to perform AGC based on the transmission level.

As in the case of the preferred embodiment, the AGC embodiment may likewise be utilized in a multiple carrier environment. Operation of the system in this multi-carrier AGC embodiment is substantially the same as that of the multi-carrier clipping embodiment, but for the AGC implementation described above. Likewise, while two embodiments have been depicted, a typical transmitter may beneficially employ both clipping and automatic gain control in a single embodiment.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system as described were directed to CDMA spread-spectrum signals transmitted over a radio communication channel. However, as will be understood by those skilled in the art, the encoding and decoding techniques described and claimed herein can also be adapted for use in other types of transmission systems like those based on time division multiple access (TDMA) and frequency division multiple access (FDMA). In addition, the communication medium (i.e., the radio channel) could alternatively be an electronic data bus, wireline, optical fiber link, satellite link, or any other type of communication channel.

What I claim is:

1. A method of mitigating signal distortion in a digital communication system, the method comprising the steps of:

obtaining a first parameter related to a power of a baseband signal waveform over a first multiple symbol period;

determining a first automatic gain control value based on the first obtained parameter;

applying the first automatic gain control value to the baseband signal waveform over the first multiple symbol period;

obtaining a second parameter related to a power of the baseband signal waveform over a second multiple symbol period;

determining a second automatic gain control value based on the second obtained parameter, wherein the second automatic gain control value does not equal the first automatic gain control value; and applying the second automatic gain control value to the baseband signal waveform over the second multiple symbol period.

2. The method of claim 1 wherein the step of determining a automatic gain control value based on the obtained parameters further comprises the step of determining an automatic gain control value based on a mean of the power of the baseband signal waveform over predetermined time period, a number of traffic channels utilized by the communication system, or a combination of both.

* * * * *